April 10, 1956  H. BENJAMIN  2,741,452
ROTARY PLUG VALVE RETAINING MEANS
Filed June 5, 1952
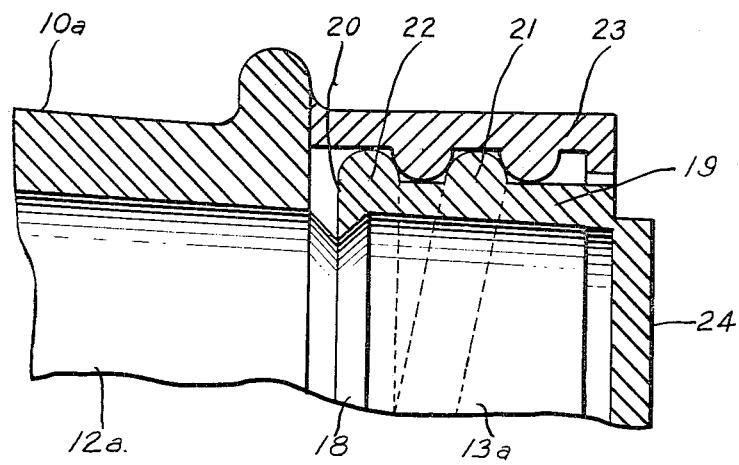
INVENTOR.
Harry Benjamin.
BY

United States Patent Office 2,741,452
Patented Apr. 10, 1956

2,741,452

ROTARY PLUG VALVE RETAINING MEANS

Harry Benjamin, Cleveland, Ohio, assignor to The Harshaw Chemical Company, Elyria, Ohio, a corporation of Ohio Application June 5, 1952, Serial No. 291,877

2 Claims. (Cl. 251—192)

This invention relates to valves, more especially to valves having tapered rotatable elements and means for holding such elements against accidental removal from the valve body. More specifically, the invention relates to stopcocks of the type used on burettes, separatory funnels and similar laboratory equipment, ordinarily composed of glass and having a ground fit between the valve body and the rotor, the present invention having more specific reference to means for preventing the rotor from being removed accidentally from the valve body.

The principal object of the present invention is to provide simple and effective means for holding valve rotors of the type indicated. A further object is to provide such a holding means which will offer very little resistance to the rotation of the valve rotor and which will be sufficiently resistant to removal to minimize the chance of accidental failure to function while at the same time permitting intentional removal. A further object is to provide simple and effective means for holding valve rotors of the character indicated which will require no change in standard construction of the valve rotor, it being understood that standard construction consists in a circumferentially grooved extension at the smaller end of the tapered rotor beyond the valve body.

With the foregoing and other objects in view, the invention consists in all the novel features of construction hereinafter described and claimed.

The figure is a fragmentary section showing a device according to the invention. The valve rotor is shown in elevation while the valve body and lock are shown in section. The section of the valve body transverse to the plane of the drawing is circular.

Referring now to the drawing, it will be seen that the valve 10a is provided with a rotor 12a of standard construction, that is, with a projection 13a having a groove 18 formed therein. Received over the projection 13a is a resilient sleeve 19 having an internal bead 20 received in the groove 18. This sleeve is also provided with an external thread 21 and an external bead 22. The sleeve 19 may be composed of polyethylene, polytetrafluoroethylene, rubber or other resilient material and should have an internal diameter such as to fit snugly over the projection 13a. The internal diameter of the sleeve 19 need not be exactly the same as that of the projection 13a but should be an approximate fit. It will be understood that the resiliency of the element 19 is such that it may be forced over the element 13a notwithstanding the fact that the bead 20 has a minimum internal diameter less than the maximum diameter of the projection 13a. In other words the sleeve 19 must be stretched over the projection 13a.

Received on the sleeve 19 is an outer sleeve 23 having an internal thread adapted to cooperate with the thread 21 and terminating at such a point as to permit the sleeve 23 to extend into engagement with the valve body 10a as shown. Inasmuch as the sleeve 23 must slidably engage against the valve body 10a it should have low surface frictional characteristics. For this a resilient material having the surface frictional characteristics of materials such as abrasive-free rubbers, polyethylenes or polyfluoroethylene should be used. The contact between the sleeves 19 and 23 should be fairly tight so that they are not accidentally separated. It will be noted that the inner end of the sleeve 23 surrounds the bead 22 rather closely and effectively prevents deformation of the inner sleeve 19 to an extent to result in removal from the projection 13a without first removing the outer sleeve 23. Since the fit between the sleeves 19 and 23 should be fairly tight, the inner sleeve 19 is provided with a rib 24 which may be held with one hand while the outer sleeve 23 is operated with the other to apply or remove the sleeve 23 during assembling or disassembling the combination of elements shown in Fig. 3.

From the foregoing it will be seen that I have provided suitable mechanism for realizing the objects of the invention and while I have shown and described the present preferred embodiment, it is obvious that variations are possible within the spirit of the invention. Accordingly, I desire to be limited only in accordance with the appended claims and the prior art.

Having thus described my invention, what I claim is:

1. In a device of the class described, a valve body having a conical opening therethrough and passages communicating with said conical opening at opposite sides thereof, a tapered valve rotor having a transverse passage extending therethrough, said rotor being received in said conical opening and being rotatable therein about its axis from a position at which said transverse passage registers with said passages in said valve body to a position at which said passages in said valve body are closed by said rotor, said rotor having its smaller end projecting beyond said valve body and being provided with integral means for engagement with a rotor holding device, and a rotor holding device engaging with said integral means and made up of an internally threaded elastic sleeve engaging against said valve body and an externally threaded elastic sleeve tightly received within said internally threaded sleeve and engaging against said integral means, said sleeves being threadedly engaged one within the other and cooperating to hold said rotor against removal from said valve body, said elastic sleeves being composed of resilient elastic material having deformability and surface frictional characteristics in the range of those exhibited by abrasive-free rubbers, polyethylenes and polyfluoroethylenes.

2. A device as defined in claim 1, wherein further, said externally threaded sleeve is provided at its outer end with a transverse projection adapted to be held manually for prevention of rotation of said externally threaded sleeve while said internally threaded sleeve is adjusted with respect thereto against the frictional resistance to relative motion resulting from the tight fit between them.

References Cited in the file of this patent

UNITED STATES PATENTS

| 2,138,767 | Matthews | Nov. 29, 1938 |
| 2,289,720 | Mueller | July 14, 1942 |
| 2,296,650 | Mueller | Sept. 22, 1942 |
| 2,412,597 | Brewer | Dec. 17, 1946 |
| 2,642,258 | Stone | June 16, 1953 |

FOREIGN PATENTS

| 20,292 | Great Britain | 1906 |
| 194,642 | Germany | 1908 |